United States Patent [19]

Murken

[11] Patent Number: 4,894,156
[45] Date of Patent: Jan. 16, 1990

[54] HOSE CONSTRUCTION, COUPLING ARRANGEMENT THEREFOR AND METHOD OF MAKING THE SAME

[75] Inventor: Joseph S. Murken, Springfield, Mo.

[73] Assignee: Dayco Products, Inc., Dayton, Ohio

[21] Appl. No.: 257,371

[22] Filed: Oct. 13, 1988

Related U.S. Application Data

[60] Division of Ser. No. 192,326, Apr. 25, 1988, Pat. No. 4,806,248, which is a continuation of Ser. No. 92,788, Sep. 2, 1987, abandoned, which is a division of Ser. No. 881,533, Jul. 2, 1986, Pat. No. 4,707,262.

[51] Int. Cl.[4] .............................................. B01D 35/00
[52] U.S. Cl. .................................... 210/448; 210/452; 285/305
[58] Field of Search ............... 210/448, 450, 451, 452; 285/140, 190, 305

[56] References Cited

U.S. PATENT DOCUMENTS

| | | | |
|---|---|---|---|
| 979,481 | 12/1910 | Hannold | 210/448 X |
| 1,854,282 | 4/1932 | Thornhill | 210/448 X |
| 2,068,858 | 1/1937 | Jones | 210/448 X |
| 2,598,818 | 6/1952 | Muirhead | 210/448 X |
| 2,658,625 | 11/1953 | Rafferty | 210/448 X |
| 2,772,898 | 12/1956 | Seeler | 285/190 |
| 3,771,664 | 11/1973 | Schrink et al. | 210/448 |
| 4,327,778 | 5/1982 | Williams | 285/47 X |
| 4,431,218 | 2/1984 | Paul, Jr. et al. | 285/305 |
| 4,433,861 | 2/1984 | Kreczik | 285/305 |
| 4,806,248 | 2/1989 | Murken | 210/448 |

FOREIGN PATENT DOCUMENTS

| | | | |
|---|---|---|---|
| 1425470 | 11/1968 | Fed. Rep. of Germany | 285/305 |
| 1319869 | 6/1973 | United Kingdom | 285/305 |

Primary Examiner—Charles Hart
Attorney, Agent, or Firm—Joseph V. Tassone

[57] ABSTRACT

A hose construction, a coupling arrangement therefor and method of making the same are provided, the coupling arrangement being utilized for conveying fluid therethrough and having a filter unit disposed therein to filter the fluid flow through the coupling arrangement, the coupling arrangement being a quick connect-disconnect coupling arrangement that comprises a first tubular coupling member having opposed open ends, a second tubular coupling member having opposed ends one of which is telecopically disposed in one of the ends of the first coupling member, and a staple-like fastening member securing the one ends of the coupling members together in the telescoping relation thereof.

1 Claim, 4 Drawing Sheets

HOSE CONSTRUCTION, COUPLING ARRANGEMENT THEREFOR AND METHOD OF MAKING THE SAME

CROSS REFERENCE TO RELATED APPLICATIONS

This application is a divisional patent application of its copending parent patent application, Ser. No. 192,326, filed Apr. 25, 1988, now U.S. Pat. No. 4,806,248, which, in turn, is a continuation patent application of its copending parent patent application, Ser. No. 92,788, filed Sept. 2, 1987, now abandoned, which, in turn, is a divisional patent application of its copending parent patent application, Ser. No. 881,533, filed July 2, 1986, now U.S. Pat. No. 4,707,262.

BACKGROUND OF THE INVENTION

1. Field of the Invention

This invention relates to a new hose construction and to a new coupling arrangement therefor or the like, as well as to a new method of making such a coupling arrangement.

2. Prior Art Statement

It is known to provide a coupling arrangement for conveying fluid therethrough and having a filter unit disposed therein to filter the fluid flow through the coupling arrangement, the coupling arrangement comprising a first tubular coupling member being threadedly connected to a second tubular coupling member with the filter unit having a part held between the threadedly interconnected coupling members to filter the fluid flow through such coupling arrangement.

It is known to provide quick connect-disconnect coupling arrangements wherein the telescoping ends of a pair of tubular coupling members are secured together by a staple-like fastening member. For example see the U.S. Pat. No. 2,772,898 to Seeler, and the U.S. Pat. No. 4,431,218 to Paul, Jr. et al.

SUMMARY OF THE INVENTION

It is one feature of this invention to provide a new coupling arrangement for conveying fluid therethrough and having a filter unit disposed therein to filter the fluid flow through the coupling arrangement by forming the coupling arrangement to be a quick connect-disconnect coupling arrangement so that the down time for changing the filter unit is relatively short when compared to the down time for changing the filter unit in a prior known coupling arrangement that is secured together by a threaded arrangement.

For example, this feature of this invention permits an in line accessibility of the filter unit taking approximately 30 seconds to change rather than the current 30 minutes for the prior known arrangement.

While the coupling arrangement of this invention can be utilized in fluid lines of various types, one such use is in a longwall mining application wherein the hose construction utilizing the filter unit would be on the longwall shield, such as the hose line interconnecting each shield, as opposed to being located on or in the valve bank as in the prior art whereby the use of the coupling arrangement of this invention would be less costly, have less down time, have easier replacement, simpler maintenance, etc.

Accordingly, one embodiment of this invention provides a coupling arrangement for conveying fluid therethrough and having a filter unit disposed therein to filter the fluid flow through the coupling arrangement, the coupling arrangement being a quick connect-disconnect coupling arrangement that comprises a first tubular coupling member having opposed open ends, a second tubular coupling member having opposed open ends one of which is telescopically disposed in one of the ends of the first coupling member, and a staple-like fastening member securing the one ends of the coupling members together in the telescoping relation thereof.

Accordingly, it is an object of this invention to provide a new coupling arrangement having one or more of the novel features of this invention as set forth above or hereinafter shown or described.

Another object of this invention is to provide a new method of making such a coupling arrangement, the method of this invention having one or more of the novel features of this invention as set forth above or hereinafter shown or described.

Another object of this invention is to provide a new hose construction utilizing such a coupling arrangement, the hose construction of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
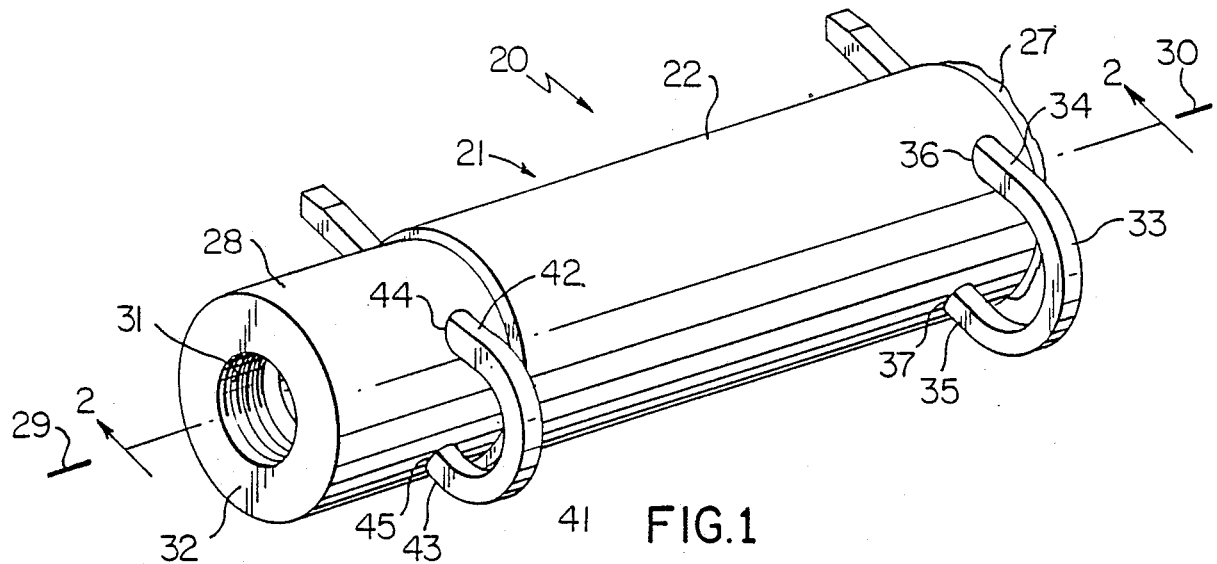
FIG. 1 is a fragmentary perspective view of the new hose construction of this invention, the coupling arrangement of this invention in FIG. 1 being illustrated in solid lines and the remainder of the hose construction being schematically illustrated.
Figure 2:
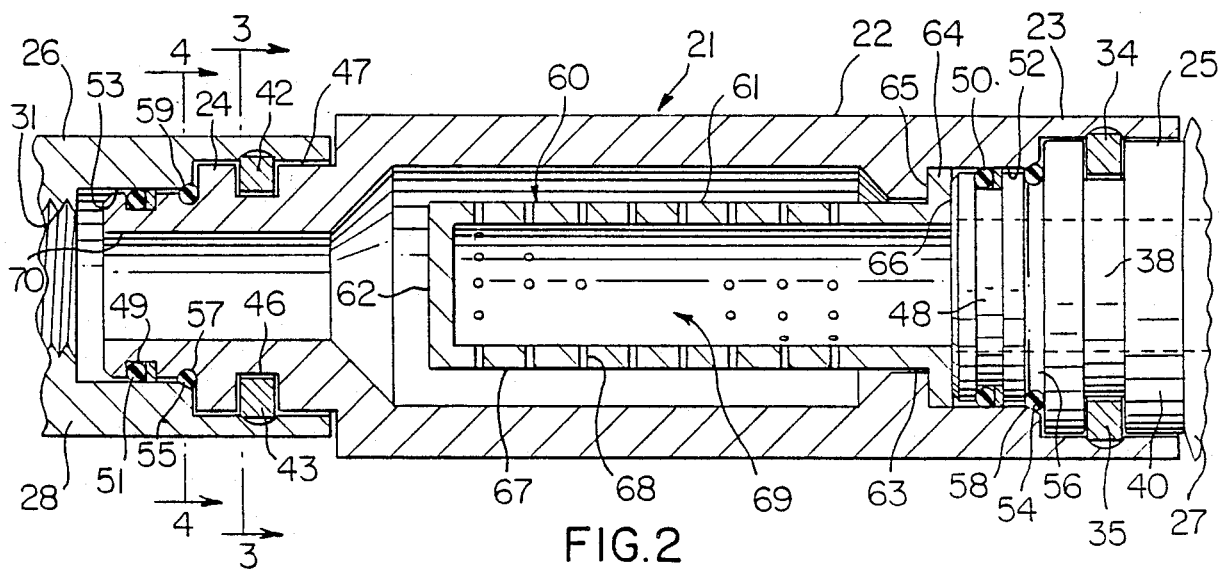
FIG. 2 is an enlarged, fragmentary cross-sectional view of the coupling arrangement of FIG. 1 and is taken on line 2—2 thereof.
Figure 3:
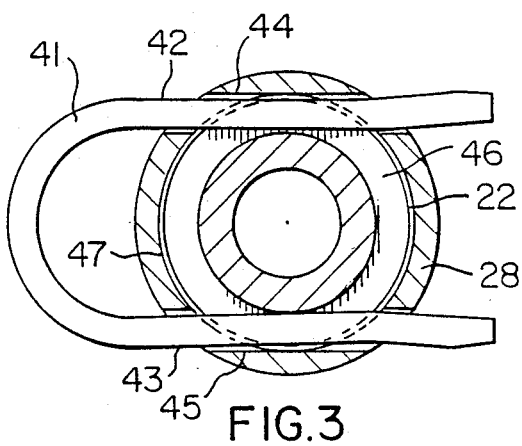
FIG. 3 is a cross-sectional view taken on line 3—3 of FIG. 2.
Figure 4:
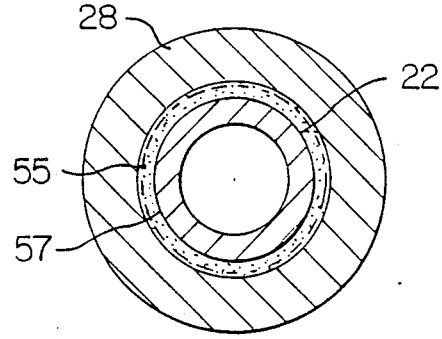
FIG. 4 is a cross-sectional view taken on line 4—4 of FIG. 2.

While the various features of this invention are hereinafter illustrated and described as being particularly adapted to provide a hose construction for the mining industry, it is to be understood that the various features of this invention can be utilized singly or in any combination thereof to provide a coupling arrangement or hose construction for other industries and/or uses as desired.

Therefore, this invention is not to be limited to only the embodiments illustrated in the drawings, because the drawings are merely utilized to illustrate one of the wide variety of uses of this invention.

Referring now to FIGS. 1-5, the improved hose construction of this invention is generally indicated by the reference numeral 20 and comprises a coupling arrangement of this invention that is generally indicated by the reference numeral 21 and comprising a first tubular coupling member 22 having opposed open ends 23 and 24 interconnected in a quick connect-disconnect in a manner hereinafter set forth to adjacent open ends 25 and 26 of adjacent coupling members 27 and 28 whereby the coupling member 27 can be considered as a second coupling member and the coupling member 28 can be considered as a third coupling member of the coupling arrangement 21.

The coupling members 27 and 28 are in turn respectively interconnected to hose or conduit lines 29 and 30 in any suitable manner known in the art, such as by a threaded connection means as illustrated by internal threads 31 formed in the end 32 of the coupling member 28. Of course, it is to be understood, that other fastening arrangements can be provided for interconnecting the hose lines 29 and 30 to the coupling members 25 and 26 as desired whereby the hose lines 29 and 30 together with the coupling arrangement 21 comprise the hose construction 20 of this invention.

It is to be understood that the coupling members 22, 27 and 28 and hose lines 29 and 30 can be formed of any suitable material and in the embodiments illustrated in the drawings, the coupling members 22, 27 and 28 are shown as being formed of metallic material.

The open end 25 of the coupling member 27 is telescopically disposed within the open end 23 of the first coupling member 22 and is secured thereto in such telescoping relation by a staple-like fastening member 33 formed of any suitable material, such as metallic material, and having its legs 34 and 35 respectively passing through opening means 36 and 37 formed through the end 23 of the coupling member 22 and being received in an annular groove 38 formed in the external peripheral surface 40 of the end 25 of the coupling member 27.

Similarly, the end 24 of the coupling member 22 is telescopically disposed within the end 26 of the coupling member 28 and is secured thereto in such telescoping relation by a staple-like fastening member 41 that can be identical to the staple-like member 33 and has the legs 42 and 43 thereof respectively passing through opening means 44 and 45 formed in the end 26 of the coupling member 28 and being received in an annular groove 46 formed in the external peripheral surface 47 of the end 24 of the coupling member 22.

The open ends 24 and 25 of the coupling members 22 and 27 are formed substantially identical to each other but in the embodiment illustrated in the drawings are of a different size. Similarly, it can be seen that the open ends 23 and 26 of the coupling members 22 and 28 are likewise formed substantially identical to each other but are of a different size.

In this manner, the open ends 23 and 25 of the coupling members 22 and 27 cooperate with each other and with the fastening member 33 in the same manner as the open ends 24 and 26 of the coupling members 22 and 28 cooperate with each other and with the fastening member 41 so that each pair of telescoping open ends are of the quick connect-disconnect type as fully disclosed and claimed in the aforementioned U.S. Pat. No. 4,431,218 to Paul, Jr., et al, whereby this patent is being incorporated into this disclosure by this reference thereto.

Therefore, the details of the quick connect-disconnect structure for the coupling arrangement 21 of this invention need not be fully set forth. However, it can readily be seen that the open ends 25 and 24 of the coupling members 27 and 22 respectively have annular grooves 48 and 49 that respectively receive annular sealing means 50 and 51 that respectively seal against the internal peripheral surfaces 52 and 53 of the open ends 23 and 26 of the coupling members 22 and 28 when the open ends 25 and 24 are respectively telescopically disposed therein.

In addition, it can be seen that the open ends 25 and 24 of the coupling members 27 and 22 respectively receive annular flexible sealing members 54 and 55 in annular grooves 56 and 57 respectively formed in the external peripheral surfaces 40 and 47 thereof, the annular flexible sealing members 54 and 55 being respectively engaged in a compressing manner by internal beveled shoulders 58 and 59 of the respective internal peripheral surfaces 52 and 53 of the open ends 23 and 26 of the coupling members 22 and 28 so as to be radially inwardly and axially compressed when the locking pins or fastening members 33 and 41 are disposed in their locking positions in order to provide a loading force on the respective fastening members 33 and 41 to tend to reduce the shock loads on the locking pins 33 and 41 in the manner fully set forth in the aforementioned U.S. Pat. No. 4,431,218 to Paul, Jr. et al.

Figure 5:
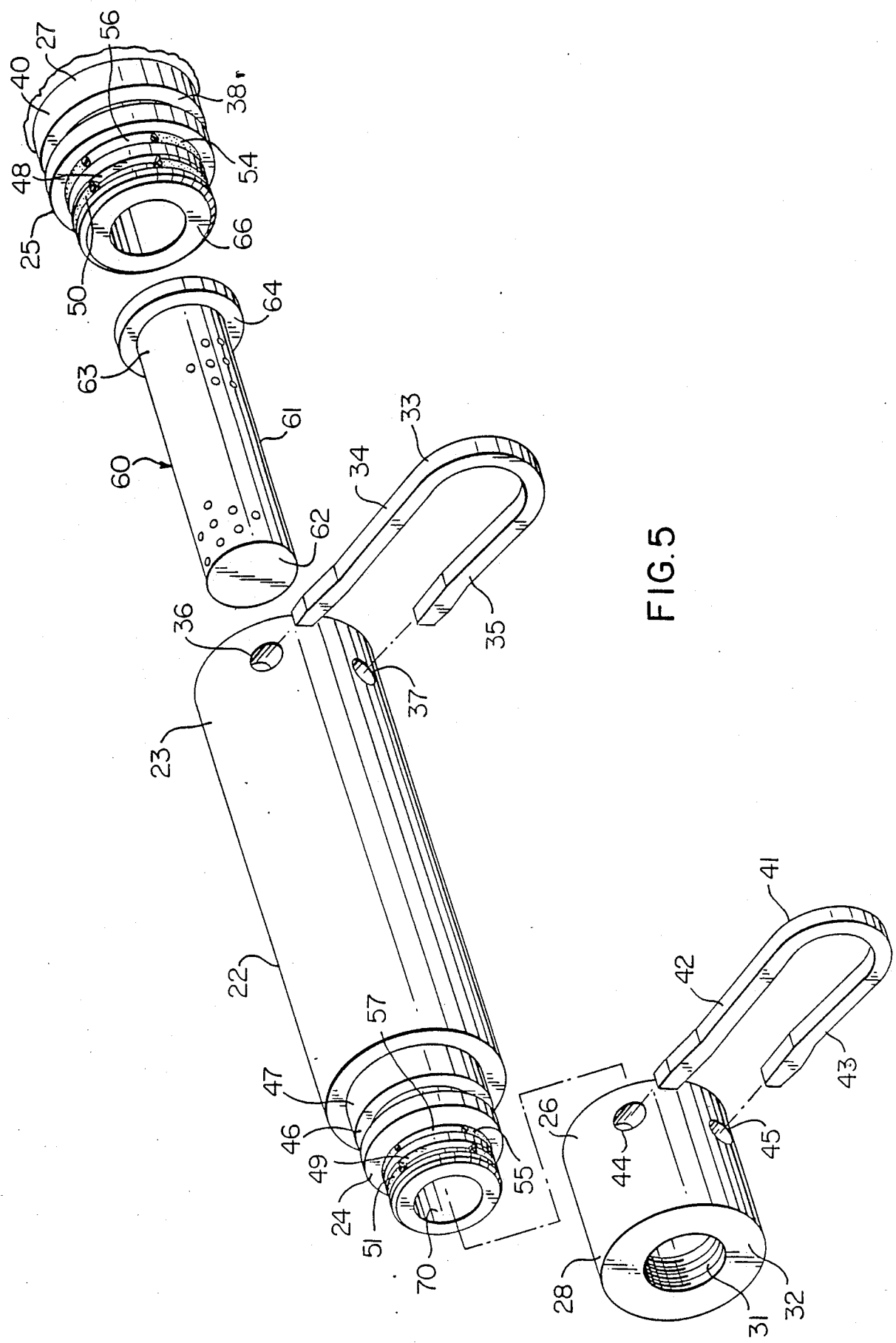
FIG. 5 is an exploded perspective view of the various parts of the coupling arrangement of FIGS. 1-4.
Figure 6:
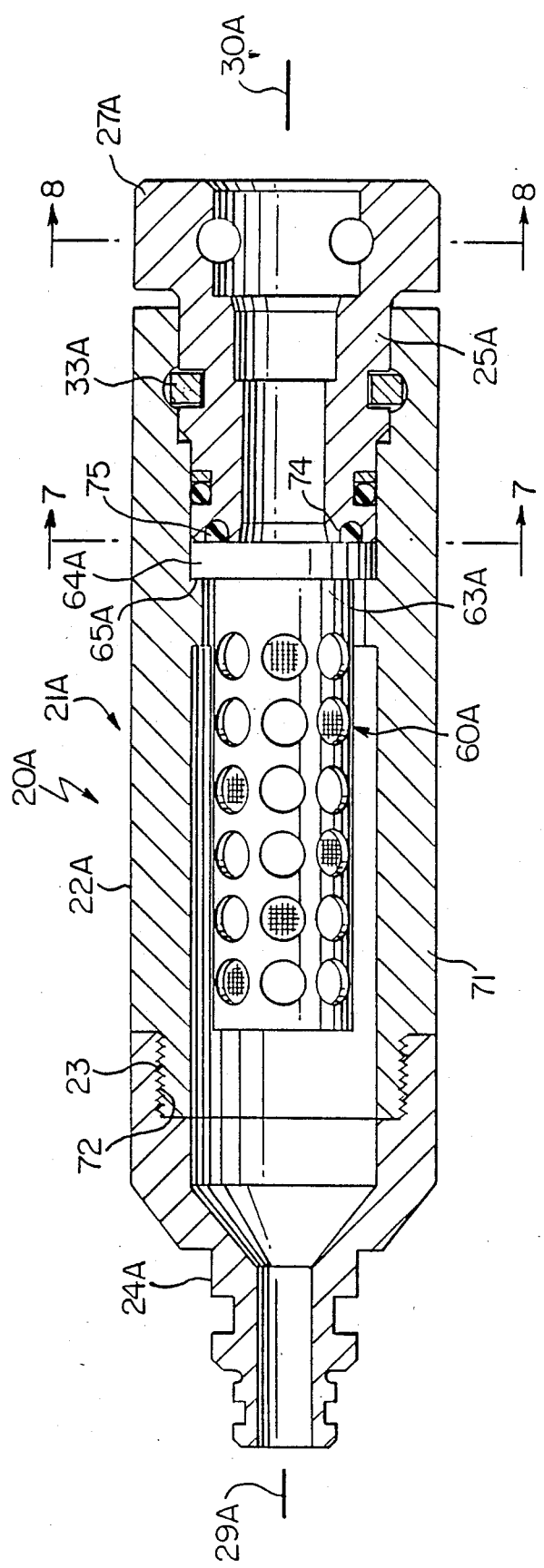
FIG. 6 is a view similar to FIG. 2 and illustrates another hose construction of this invention, FIG. 6 illustrating the coupling arrangement of the hose construction in cross-section and the remainder of the hose construction schematically.
Figure 8:
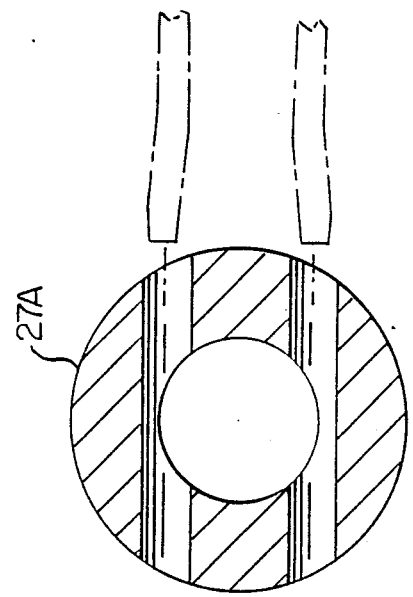
FIG. 8 is a cross-sectional view taken on line 8—8 of FIG. 6 and illustrates in fragmentary phantom lines an additional staple-like fastening member.
Figure 7:
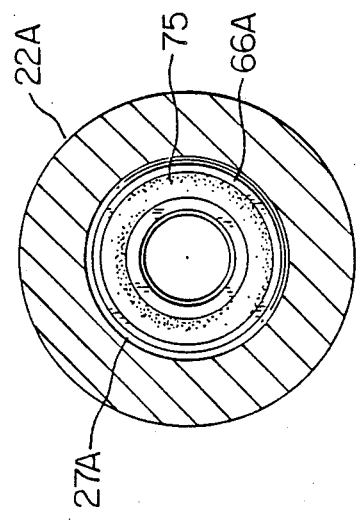
FIG. 7 is a cross-sectional view taken on line 7—7 of FIG. 6.
Figure 9:
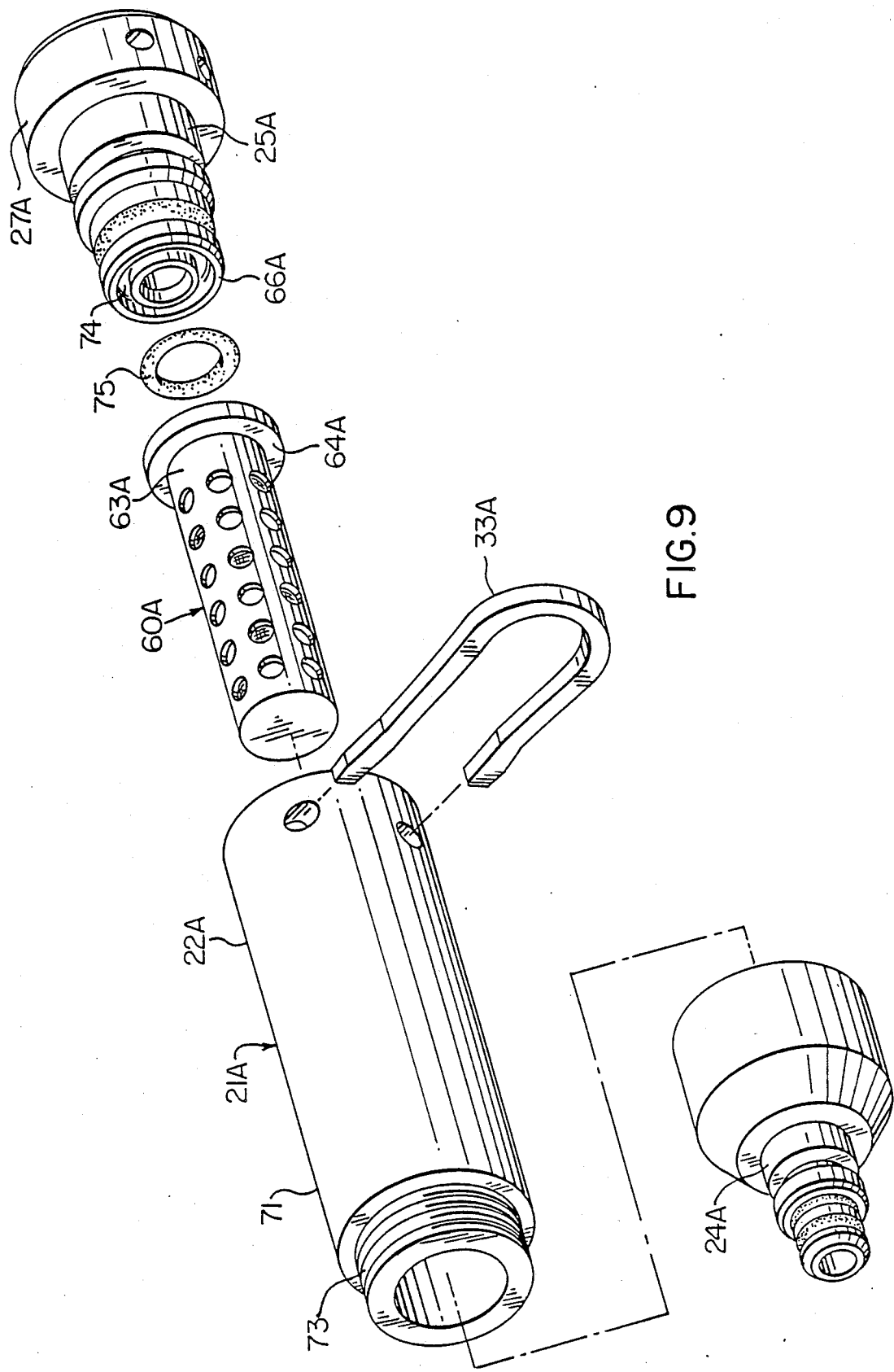
FIG. 9 is an exploded perspective view of the various parts of the coupling arrangement of FIGS. 6-8.

Thus, when it is desired to disconnect the coupling member 22 from the coupling member 27, the staple-like fastening member 33 is removed from the openings 36 and 37 as illustrated in FIG. 5 and the end 25 of the coupling member 27 is then adapted to be untelescoped from the end 23 of the coupling member 22 whereby it can be seen that the coupling members 22 and 27 together with the staple-like member 33 define a quick connect-disconnect coupling arrangement.

Similarly, the ends 24 and 26 of the coupling members 22 and 28 can be uncoupled by merely removing the staple-like fastening member 41 from the openings 44 and 45 so that the ends 24 and 28 of the coupling members 22 and 28 can then be untelescoped so that the coupling members 22 and 28 together with the staple-like fastening member 41 provides another quick connect-disconnect coupling arrangement.

A filter unit that is generally indicated by the reference numeral 60 in the drawings comprises a self-contained unit that is disposed within the coupling member 22 and is secured therein when the end 25 of the coupling member 27 has been fully telescoped within the end 23 of the coupling member 22 whereby the fastening member 33, when fastening the ends 25 and 23 of the coupling members 27 and 22 together in the manner previously set forth, effectively secures the filter unit 60 within the coupling arrangement 21.

The filter unit 60 can be formed in any suitable manner and in the embodiment thereof illustrated in the drawings comprises a cup-shaped tubular housing 61 formed of any suitable material, such as metallic material, plastic material, etc. and having a closed end 62 and an open end 63, the open end 63 being defined by an outwardly directed annular flange 64 adapted to be trapped between an internal annular shoulder 65 of the coupling member 22 and an annular shoulder or end face 66 of the open end 25 of the coupling member 27 as illustrated.

The side wall 67 of the cup-shaped housing 61 of the filter unit 60 can be provided with a plurality of openings 68 passing therethrough and leading to an internal chamber 69 of the housing 61 which is adapted to contain any suitable filtering material therein if desired.

For example, when such filter unit 60 is to be utilized in the longwall mining application previously described, the filter unit 60 can be constructed to have a filter capability of approximately 2 microns to approximately 800 microns as the same filters the fluid flow through the hose construction 20 and/or coupling arrangement 21 as is well known in the art.

However, as previously stated, by utilizing the coupling arrangement 21 that is of the quick connect-disconnect type and is adapted to sandwich the flange 64 of the filter unit 60 between the cooperating shoulder means 65 and 66 of the coupling members 22 and 27, the filter unit 60 can be readily replaced in the field as the coupling members 22 and 27 can readily be uncoupled by merely removing the staple-like fastening member 33 so that the filter unit 60 can be removed and a new one be placed therein in a relatively short period of time as contrasted with the prior known arrangement wherein the coupling members are secured together by a threaded relation therebetween.

It should be noted that the coupling arrangement 21 is so constructed and arranged that when the shoulder means 65 and 66 of the coupling members 22 and 27 compact the annular flange 64 of the filter unit 60 therebetween, the annular sealing member 54 is placed under radial and axial compression by the beveled shoulder means 58 for the purpose previously described.

Therefore, it can be seen that the coupling construction 20 of this invention can be formed by the relatively simple method of this invention to filter fluid flow through the hose construction 20 as previously set forth.

While the coupling construction 21 of this invention which has been previously described as having the coupling member 28 provide a quick connect-disconnect coupling arrangement with the open end 24 of the coupling member 22, it is to be understood that the open end 24 of the coupling member 22 could be provided with internal threads on the internal peripheral surface 70 of the open end 24 thereof so as to couple directly to other structure by a threaded relation if desired.

Another hose construction and coupling arrangement therefor of this invention are respectively generally indicated by the reference numerals 20A and 21A in FIGS. 6–9 wherein parts thereof similar to the hose construction 20 and coupling arrangement 21 therefor as previously described are indicated by like reference numerals followed by the reference letter "A".

As illustrated in FIGS. 6–9, the coupling construction 21A is substantially identical to the coupling construction 21 previously described except that the end 24A of the coupling member 22A comprises a tubular part that is formed separately from the remainder or body portion 71 of the coupling member 22A and is provided with an internal threaded portion 72 that threads to an external threaded portion 73 of the remainder or body portion 71 of the coupling member 22A as illustrated. In this manner, the end 24A of the coupling member 22A can be removed therefrom and replaced by another sized part 24A in a threaded relation therewith. Thus, other sized ends 24A for coupling to different sized coupling members similar to the coupling member 28 previously described can be utilized with the same body part 71 whereby such an arrangement reduces production costs and simplifies inventory requirements for the end user.

In addition, the adapter or coupling member 27A of the coupling arrangement 21A is not provided with the sealing member 54 and its annular groove 56 previously described that cooperate with the beveled shoulder 58 as previously described. Instead, the end face or shoulder means 66A of the end 25A of the coupling member 27A is provided with an annular groove 74 which receives part of an annular flexible O-ring like sealing member 75 therein that is adapted to be disposed in sealing compressed relation against the annular flange 64A of the filter unit 60A when the flange 64A is sandwiched between the internal shoulder means 65A of the coupling member 22A and the end face or shoulder means 66A of the coupling member 27A when the same are secured together by the fastening member 33A in the manner previously set forth.

Thus, the compressed sealing member 75 provides a dual function of sealing the open end 63A of the filter unit 60A and provides an axial loading of the coupling member 27A on the staple-like fastening member 33A so as to eliminate linear movement between the coupling members 27A and 22A when the hose line 20A is pressurized and thereby greatly improves the mechanical engagements and dynamic and static applications thereof.

Therefore, it can be seen that the coupling arrangement 21A of this invention provides a quick connect-disconnect coupling arrangement for removing and replacing the filter unit 60A in substantially the same manner as the coupling arrangement 21 previously described except that the coupling member 27A has the flexible annular sealing member 75 for providing the dual function of sealing against the open end 63A of the filter unit 60A while preloading the fastening member 33A for the reasons previously set forth whereby the sealing member 75 eliminates the need for the sealing member 54 of the coupling member 27 previously set forth.

However, it is to be understood that the coupling member 27 previously set forth could be provided with an annular groove in the end face 66 thereof and receive an annular sealing member therein in the same manner as the annular sealing member 75 previously set forth so that such annular sealing member 75 could be utilized in combination with the annular sealing member 54 if desired.

Therefore, it can be seen that this invention not only provides a new hose construction and a new coupling arrangement for such a hose construction, but also this invention provides a new method of making such a coupling construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a coupling arrangement for conveying fluid therethrough and having a filter unit disposed therein to filter the fluid flow through said coupling arrangement, the improvement comprising the steps of forming said coupling arrangement to be a quick connect-disconnect coupling arrangement that comprises a first tubular coupling member having opposed open ends, a second tubular coupling member having opposed open ends one of which is telescopically disposed in one of said ends of said first coupling member, and a removable fastening member securing said one ends of said coupling members together in the telescoping relation thereof, forming said filter unit to have means that is held between said one ends of said coupling members when said one ends are in said secured telescoping relation thereof whereby said filter unit is secured in said coupling arrangement by said means thereof, disposing an annular flexible sealing member to be carried by said coupling arrangement and be in a compressed relation therein to provide a loading force on said filter unit and on said fastening member, forming said means of said filter unit to comprise an outwardly directed annular flange, forming said one end of said first coupling member to have an internal annular shoulder means, forming said one end of said second coupling member to have an annular shoulder means, disposing said annular flange of said filter unit to be held in sandwiched relation between said shoulder means when said one ends are in said secured telescoping relation, and forming one of said shoulder means to carry said annular flexible sealing member in said compressed relation between said one shoulder means and said annular flange of said filter unit when said one ends are in said secured telescoping relation.

* * * * *

Disclaimer 4,894,156.—*Joseph S. Murken*, Springfield, Mo. HOSE CONSTRUCTION, COUPLING ARRANGEMENT THEREFOR AND METHOD OF MAKING THE SAME. Patent dated Jan. 16, 1990. Disclaimer filed Nov. 9, 1989, by the assignee, Dayco Products, Inc.

The term of this patent subsequent to October 27, 2004, has been disclaimed.
[*Official Gazette May 1, 1990*]